United States Patent
Domsch et al.

(10) Patent No.: US 9,229,731 B2
(45) Date of Patent: Jan. 5, 2016

(54) SYSTEM AND METHOD FOR FACILITATING BOOTING USING A PLURALITY OF BOOT METHODS

(75) Inventors: Matthew L. Domsch, Austin, TX (US); Charles Terrence Perusse, Jr., Pflugerville, TX (US); Jon Robert Hass, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1112 days.

(21) Appl. No.: 13/102,473

(22) Filed: May 6, 2011

(65) Prior Publication Data

US 2012/0284495 A1    Nov. 8, 2012

(51) Int. Cl.
| | |
|---|---|
| *G06F 11/00* | (2006.01) |
| *G06F 12/14* | (2006.01) |
| *G06F 9/44* | (2006.01) |
| *G06F 21/56* | (2013.01) |
| *G06F 21/57* | (2013.01) |

(52) U.S. Cl.
CPC ............ *G06F 9/4416* (2013.01); *G06F 21/568* (2013.01); *G06F 21/575* (2013.01)

(58) Field of Classification Search
CPC .... G06F 9/4416; G06F 21/568; G06F 21/575
See application file for complete search history.

(56) References Cited

U.S. PATENT DOCUMENTS

| | | | | |
|---|---|---|---|---|
| 6,925,533 | B2 | 8/2005 | Lewis | 711/118 |
| 7,234,053 | B1 * | 6/2007 | Mahmoud | 713/2 |
| 7,747,847 | B2 | 6/2010 | El Zur et al. | 713/2 |
| 2003/0005096 | A1 | 1/2003 | Paul et al. | 709/222 |
| 2003/0069999 | A1 | 4/2003 | Cheston et al. | 709/316 |
| 2005/0005197 | A1 | 1/2005 | Chong et al. | 714/36 |
| 2006/0206666 | A1 | 9/2006 | Lambert et al. | 711/115 |
| 2008/0209196 | A1 * | 8/2008 | Hernandez et al. | 713/2 |
| 2008/0301425 | A1 | 12/2008 | Mittapalli et al. | 713/2 |
| 2009/0172384 | A1 * | 7/2009 | Anson | 713/2 |
| 2010/0235615 | A1 * | 9/2010 | Manczak et al. | 713/2 |
| 2012/0191960 | A1 * | 7/2012 | Piwonka et al. | 713/2 |
| 2012/0216284 | A1 * | 8/2012 | Dhamankar et al. | 726/24 |

OTHER PUBLICATIONS

U.S. Appl. No. 12/915,407, filed Oct. 29, 2010; pp. 28.
The Open Firmware Working Group, TFTP Booting Extension Version 1.0, Aug. 1998, the Open Firmware Working Group, www.openfirmware.org/1275/practice/, Aug. 1, 1998.
Etherboot/gPXE Wiki; "Boot scripts"; http://www.etherboot.org/wiki/scripting; pp. 2, Oct. 18, 2010.

(Continued)

*Primary Examiner* — Abdelmoniem Elamin
(74) *Attorney, Agent, or Firm* — Baker Botts L.L.P.

(57) ABSTRACT

Systems and methods for reducing problems and disadvantages associated with multiple boot methods are disclosed. In accordance with an embodiment of the present disclosure, an information handling system comprises a processor and a memory communicatively coupled to the processor. The information handling system also comprises an access controller communicatively coupled to the processor. The access controller is configured to retrieve non-bootable executable instructions and combine the non-bootable executable instructions with a boot loader associated with a boot method to generate a bootable image associated with the boot method. The access controller is further configured to present the bootable image to the information handling system such that the bootable image is configured to be booted by the information handling system using the boot method.

17 Claims, 2 Drawing Sheets

(56) References Cited

OTHER PUBLICATIONS

Microsoft; "Enabling Diskless Windows Boot With iSCI"; download.microsoft.com/download/5/b/9/5b97017b.../sto026_wh06.ppt; pp. 12, Oct. 18, 2010.

Microsoft; "iSCI Boot Firmware Table (iRFT) as Defined in ACPI 3.0b Specification"; http://microsoft.com/whdc/system/platform/firmware/default.mspx ; pp. 11, Aug. 21, 2009.

* cited by examiner

SYSTEM AND METHOD FOR FACILITATING BOOTING USING A PLURALITY OF BOOT METHODS

TECHNICAL FIELD

The present disclosure relates in general to information handling systems, and more particularly to a system and method for facilitating booting an operating system to an information handling system using a plurality of boot methods.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be configured to boot an operating system from a variety of sources using a variety of methodologies (e.g., from a floppy disc, an optical disc (CD/DVD), a hard disc drive, a flash drive, a network etc.). Each boot method is associated with a separate boot loader to allow an information handling system to boot an operating system using the specific method. Each boot loader may include identical content required for booting an operating system (e.g., an operating system kernel, initial ramdisk files etc.), but such content may not be accessed and booted from without being combined with or "wrapped" in a boot loader. This content may be referred to as "non-bootable" content. Accordingly, to allow an information handling system to boot an operating system using multiple methodologies, the same non-bootable content may be replicated and combined with separate boot loaders to create multiple bootable images with the same non-bootable content stored on multiple computer readable mediums (e.g., CD, floppy, hard drive, flash drive). In traditional systems, this required replication may result in inefficiencies and inflexibility in terms of an information handling system booting an operating system using new or different boot methodologies.

For example, an information handling system may be configured to boot from a CD and a flash drive, but the user of the information handling system may only have a bootable CD that includes a bootable image of an operating system. For a variety of reasons, the user may desire to boot the information handling system from the flash drive. However, the user may not simply copy the bootable image from the CD to the flash drive, because the boot loader for booting from the CD may be different from boot loader for booting from the flash drive (even though the non-bootable content may be identical). Accordingly, with traditional systems, the user may need to request a flash drive boot image that includes a boot loader associated with booting from a flash drive and the same non-bootable content of the CD boot image. This process may be slow, inconvenient and cumbersome for the user.

SUMMARY

In accordance with the teachings of the present disclosure, the disadvantages and problems associated with multiple boot methodologies may be reduced or eliminated. In accordance with an embodiment of the present disclosure, an information handling system comprises a processor and a memory communicatively coupled to the processor. The information handling system also comprises an access controller communicatively coupled to the processor. The access controller is configured to retrieve non-bootable executable instructions and combine the non-bootable executable instructions with a boot loader associated with a boot method to generate a bootable image associated with the boot method. The access controller is further configured to present the bootable image to the information handling system such that the bootable image is configured to be booted by the information handling system using the boot method.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
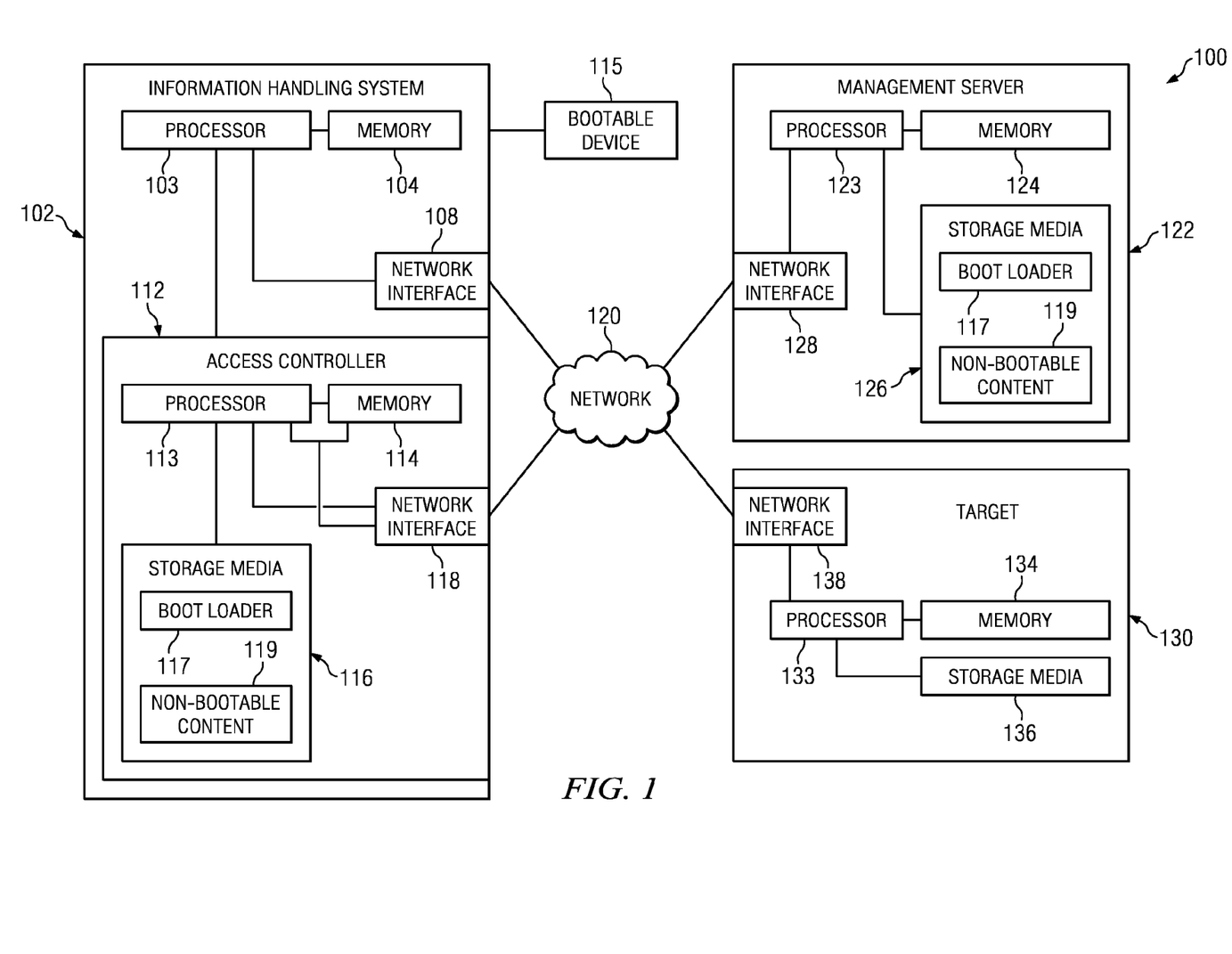
FIG. 1 illustrates a block diagram of an example system for booting of an information handling system using one or more boot methodologies, in accordance with certain embodiments of the present disclosure.

FIG. 1 illustrates a block diagram of an example system 100 for booting an information handling system 102 using one or more boot methodologies, in accordance with certain embodiments of the present disclosure. As depicted in FIG. 1, system 100 may include an information handling system 102, a network 120, a management server 122, a bootable device 115 and a target 130.

As described in further detail below, information handling system 102 may be configured to boot an operating system (OS) using a plurality of boot methodologies. Additionally, information handling system 102 may include an access controller 112 configured to generate bootable images for each boot method of information handling system 102. Therefore, a user of information handling system 102 may simply have information handling system 102 boot an operating system using any one of its associated boot methodologies, regardless of whether the user is in possession of a bootable image of the operating system associated with a specific boot method. In contrast, in traditional systems if the user desires for an information handling system to boot an operating system using a specific boot method, the user needs to be in possession of a bootable image of that operating system associated with the specific boot method.

Information handling system 102 may generally be operable to receive data from and/or communicate data to one or more other information handling systems via network 120. In certain embodiments, information handling system 102 may be a server. In another embodiment, information handling system 102 may be a personal computer (e.g., a desktop computer or a portable computer).

As depicted in FIG. 1, information handling system 102 may include a processor 103, a memory 104 communicatively coupled to processor 103, a network interface 108 communicatively coupled to processor 103, and an access controller 112 coupled to processor 103.

Processor 103 may include any system, device, or apparatus configured to interpret and/or execute program instructions and/or process data associated with information handling system 102. Processor 103 may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off Network interface 108 may include any suitable system, apparatus, or device operable to serve as an interface between information handling system 102 and network 120. Network interface 108 may enable information handling system 102 to communicate over network 120 using any suitable transmission protocol and/or standard, including without limitation all transmission protocols and/or standards enumerated below with respect to the discussion of network 120. In certain embodiments, network interface 108 may be configured with hardware, software, and/or firmware to allow its associated information handling system 102 to remotely boot from a computer-readable medium remote from information handling system 102 (e.g., a computer-readable medium coupled to network interface 108 via network 120). Therefore, information handling system 102 may be configured to perform a network boot, using any suitable network boot protocol and boot loader. For example, a network boot protocol may allow information handling system 102 to boot from a remote target 130 via network 120. Some examples of a network boot may include an Internet Small Computer System (iSCSI) boot and a pre-boot execution environment (PXE) boot.

Information handling system 102 may also be configured to boot from one or more bootable devices 115 associated with information handling system 102. Bootable device 115 may comprise any suitable device communicatively coupled to information handling system 102 that may support a bootable medium from which information handling system 102 may boot. For example, bootable device 115 may comprise a hard drive, a floppy drive, a CD and/or DVD drive, a flash drive or any other suitable drive. Bootable device 115 may be a device internal or external to information handling system 102 and may be coupled to information handling system 102 with any suitable interface (e.g., a universal serial bus (USB) port, an internal bus, etc.) Additionally, in some embodiments, bootable device 115 may comprise a virtual device presented to information handling system 102 by an access controller 112 (described in further detail below) as being a physical bootable device. Therefore, information handling system 102 may be configured to boot from a plurality of devices using a variety of methodologies.

As mentioned above, each boot method may be associated with a separate boot loader to allow information handling system 102 to boot an operating system using the specific method. Each boot loader may include identical content required for booting an operating system (e.g., an operating system kernel, initial ramdisk files, bootloader configuration files etc.), but that may not be accessed and booted from without being combined with a boot loader. This content may be referred to as "non-bootable" content or non-bootable executable instructions.

An access controller 112 of information handling system 102 may be configured to combine non-bootable content with any one of the boot loaders associated with one of the boot methodologies from which information handling system 102 is configured to boot. As described in further detail with respect to FIG. 2, access controller 112 may receive the non-bootable content from a management server 122 and combine the non-bootable content with a boot loader associated with a boot method of information handling system 102. In alternative embodiments, as described with respect to FIG. 3, access controller 112 may be configured to receive a bootable image associated with one boot method and may extract the non-bootable content from the bootable image and combine the non-bootable content with a boot loader associated with a different boot method. Accordingly, access controller 112 may create a bootable image associated with any of the boot methodologies used by information handling system 102 to facilitate booting to "non-bootable" content using any of the boot methodologies. Thus, access controller 112 may facilitate booting an operating system to information handling system 102 using any of the boot methodologies without requiring the user of information handling system 102 to be in possession of a specific bootable image for the operating system and associated with a specific boot method.

Access controller 112 may be any system, device, or apparatus configured to monitor and/or manage information handling system 102. In certain embodiments, access controller 112 may include or may be an integral part of a Dell Remote Access Controller (DRAC) or an Integrated Dell Remote Access Controller (iDRAC). Access controller 112 may be configured to permit an administrator or other person to remotely monitor and/or remotely manage information handling system 102 (e.g., via a management server 122 remotely connected to information handling system 102 via network 120) regardless of whether information handling system 102 is powered on and/or has an operating system installed thereon.

In certain embodiments, access controller 112 may be configured to internally and securely communicate information to information handling system 102 without utilizing network 120. Thus, for example, if network 120 is unavailable or experiencing other performance problems, access controller 112 may still maintain communication with information handling system 102 and thus perform management operations of information handling system 102. Additionally, the internal and secure connection between access controller 112 and information handling system 102 may protect the information and data being transferred between information handling system 102 and access controller 112 from being accessed by unauthorized parties.

As depicted in FIG. 1, access controller 112 may include a processor 113, a memory 114 communicatively coupled to processor 113, a storage media 116 communicatively coupled to processor 103 and a network interface 118 communicatively coupled to processor 113.

Processor 113 may include any system, device, or apparatus configured to interpret and/or execute program instructions and/or process data associated with access controller 112. Processor 113 may include, without limitation a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102.

Memory 114 may be communicatively coupled to processor 113 and may include any system, device, or apparatus configured to retain program instructions and/or data for a period of time (e.g., computer-readable media). Memory 114 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In certain embodiments, memory 114 may store firmware that includes executable instructions to govern operation of access controller 112. Storage media 116 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

In the present example, memory 114 and/or storage media 116 may include one or more boot loaders 117 associated with the boot methodologies of information handling system 102. Additionally, in some embodiments, memory 114 and/or storage media 116 may include non-bootable content 119 associated with one or more operating systems for combining with the boot loaders. Therefore, as described in further detail in FIGS. 2 and 3, access controller 112 may combine any one of boot loaders 117 with non-bootable content 119 (e.g., an operating system kernel) to create a bootable image for the operating system and associated with any of the boot methodologies of information handling system 102.

Network interface 118 may include any suitable system, apparatus, or device operable to serve as an interface between access controller 112 and network 120. Network interface 118 may enable access controller 102 to communicate over network 120 using any suitable transmission protocol and/or standard, including without limitation all transmission protocols and/or standards enumerated below with respect to the discussion of network 120.

Network 120 may be a network and/or fabric configured to communicatively couple information handling system 102, access controller 112, management server 122, target 130, other information handling systems, and/or other networked components to each other. Network 120 may include a communication infrastructure, which provides physical connections, and a management layer, which organizes the physical connections, information handling system 102, access controller 112, management server 122, and target 130. In the same or alternative embodiments, network 120 may allow block I/O services and/or file access services to network-attached computer-readable media.

Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Management server 122 may comprise an information handling system and may generally be operable to receive data from and/or communicate data to one or more other information handling systems via network 120. In certain embodiments, management server 122 may be configured to communicate data and/or instructions to information handling system 102. In the same or other embodiments, management server 122 may be configured to securely communicate non-bootable content to access controller 112 such that access controller 112 may combine the non-bootable content with the boot loaders stored thereon to create bootable images associated with the boot methodologies of information handling system 102, as described in greater detail with respect to FIG. 2.

As depicted in FIG. 1, management server 122 may include a processor 123, a memory 124 communicatively coupled to processor 123, storage media 126 communicatively coupled to processor 123, and a network interface 128 communicatively coupled to processor 123.

Processor 123 may include any system, device, or apparatus configured to interpret and/or execute program instructions and/or process data associated with management server 122. Processor 123 may include, without limitation a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124, storage media 126 and/or another component of management server 122.

Memory 124 may be communicatively coupled to processor 123 and may include any system, device, or apparatus configured to retain program instructions and/or data for a period of time (e.g., computer-readable media). Memory 124 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to management server 122 is turned off Storage media 126 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

As shown in the present example, memory 124 and/or storage media 126 may also include non-bootable content 119 associated with one or more operating systems (e.g., one or more operating system kernels) that may be communicated from management server 122 to access controller 112. This communication is described in greater detail with respect to FIG. 2. In the same or alternative embodiments, memory 124 and/or storage media 126 may additionally include one or more boot loaders 117 associated with one or more of the boot methodologies of information handling system 102. In such embodiments, management server 122 may also communicate the one or more boot loaders 117 to access controller 112.

In the present example boot loaders 117 and non-bootable content 119 are depicted as being stored on both storage media 116 of access controller 112 and storage media 126 of management server 122. However, it is understood that boot loaders 117 and non-bootable content 119 may all be stored on storage media 116 or storage media 126 or any combination of both. For example, storage media 126 may include a boot loader 117 associated with one boot method of information handling system 102 and storage media 116 may include a boot loader 117 associated with another boot method of information handling system. Additionally, in the same or alternative embodiments, storage media 126 may include non-bootable content 119 associated with one operating system while storage media 116 may include non-bootable content 119 associated with another operating system.

Network interface 128 may include any suitable system, apparatus, or device operable to serve as an interface between management server 122 and network 120. Network interface 128 may enable management server 122 to communicate over network 120 using any suitable transmission protocol and/or standard, including without limitation all transmission protocols and/or standards enumerated above with respect to the discussion of network 120. In certain embodiments, network interface 128 may be configured with hardware, software, and/or firmware to allow its associated management server 122 to remotely boot from a computer-readable medium remote from information handling system 102 (e.g., a computer-readable medium coupled to network interface 108 via network 120). In the same or other embodiments, network interface 128 may be configured with hardware, software, and/or firmware to allow its associated management server 122 to remotely boot from a computer-readable medium remote from access controller 112 (e.g., a computer-readable medium coupled to network interface 118 via network 120).

Target 130 may comprise an information handling system and may comprise any system, apparatus or device configured to communicate or transfer data or information with information handling system 102 via network 120. In some embodiments target 130 may comprise a device having an operating system or other programs stored thereon and may be configured to allow information handling system 102 to perform a network boot of the operating system from target 130 via network 120. For example, in some embodiments, target 130 may be configured as an iSCSI target device such that an information handling system 102 including an iSCSI initiator may perform an iSCSI boot with respect to target 130. In other embodiments, target 130 may include a web server such that an information handling system 102 including a web client may perform a secure network boot (e.g., using HTTPS) from target 130.

As depicted in FIG. 1, target 130 may include a processor 133, a memory 134 communicatively coupled to processor 133, storage media 136 communicatively coupled to processor 133, and a network interface 138 communicatively coupled to processor 133.

Processor 133 may include any system, device, or apparatus configured to interpret and/or execute program instructions and/or process data associated with target 130. Processor 133 may include, without limitation a microprocessor, microcontroller, digital signal processor (DSP), application specific integrated circuit (ASIC), or any other digital or analog circuitry configured to interpret and/or execute program instructions and/or process data. In some embodiments, processor 133 may interpret and/or execute program instructions and/or process data stored in memory 134, storage media 136 and/or another component of target 130.

Memory 134 may be communicatively coupled to processor 133 and may include any system, device, or apparatus configured to retain program instructions and/or data for a period of time (e.g., computer-readable media). Memory 134 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to target 130 is turned off.

Storage media 136 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs). For example, storage media 136 may include an operating system to which information handling system 102 may boot.

Network interface 138 may include any suitable system, apparatus, or device operable to serve as an interface between target 130 and network 120. Network interface 138 may enable provisioning server to communicate over network 120 using any suitable transmission protocol and/or standard, including without limitation all transmission protocols and/or standards enumerated above with respect to the discussion of network 120. In certain embodiments, network interface 138 may be configured with hardware, software, and/or firmware to allow its associated target 130 to remotely boot to information handling system 102.

Modifications, additions, or omissions may be made to system 100 without departing from the scope of the present disclosure. For example, although system 100 only depicts one bootable device 115, it is understood that information handling system 102 may be associated with a plurality of bootable devices 115. Additionally, in alternative embodiments, information handling system 102 may be configured to only perform network boots, but using a plurality of network boot methods.

Figure 2:
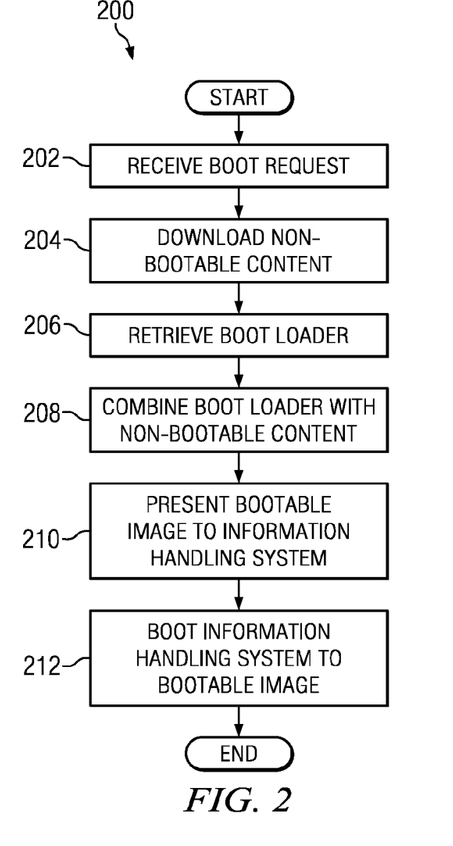
FIG. 2 illustrates a flow chart of an example method for configuring an information handling system to boot an operating system using one or more boot methodologies, in accordance with certain embodiments of the present disclosure.

FIG. 2 illustrates a flow chart of an example method 200 for configuring an information handling system (e.g., information handling system 102 of FIG. 1) to boot an operating system using one or more boot methodologies, in accordance with certain embodiments of the present disclosure. The steps of method 200 are described as being performed by access controller 112 of FIG. 1, but it is understood than any suitable system, apparatus or device may be used to perform one or more of the steps of method 200. As noted above, teachings of the present disclosure may be implemented in a variety of configurations of system 100. As such, the initialization point for method 200 and the order of the steps 202-212 comprising method 200 may depend on the implementation chosen.

At step 202, access controller 112 may receive a boot request from a user. The boot request may include the operating system type (e.g., Windows, Linux, etc.) that the user desires information handling system 102 to boot. The boot request may also include the boot method or boot device type that the user desires. For example, the boot request may indicate that the user desires information handling system 102 to boot to a USB flash drive that includes the operating system. In another example, the boot request may indicate that the user desires information handling system 102 to perform a network boot from target 130 via network 120. Additionally, in this particular example, the boot request may also include information indicating the location of non-bootable content 119 associated with the indicated operating system (e.g., the location of the operating system kernel) stored on management server 122. In alternative embodiments, the non-bootable content 119 associated with the indicated operating system may be saved locally on access controller 112, and the location information may indicate where the non-bootable content 119 is stored on access controller 112. Further, the boot request may include other configuration information necessary for creating the bootable image (e.g., grand unified boot loader (GRUB) configuration information).

At step 204, access controller 112 may download the non-bootable content 119 (e.g., operating system kernel) associated with the operating system indicated in the boot request from management server 122 based on the location information included in the boot request. As mentioned above, access controller 112 may have a secure connection with management server 112, therefore, the non-bootable content may be securely transferred to access controller 112. In alternative embodiments, access controller 112 may retrieve the non-bootable content 119 from a storage device (e.g. memory 114 or storage media 116) of access controller 112, based on the location information included in the boot request.

At step 206, access controller 112 may retrieve the boot loader 117 associated with the desired boot method or boot device indicated in the boot request. As shown in FIG. 1, the boot loader 117 may be stored locally on a storage device of access controller 112 (e.g., storage media 116) and may be retrieved from the local storage device or the boot loader 117 may be remotely stored on a storage device associated with management server 122 (e.g., storage media 126) and access controller 112 may securely download the boot loader from management server 122.

At step 208, access controller 112 may combine the boot loader 117 with the non-bootable content 119 and any other configuration information to generate a bootable image associated with the desired boot method (e.g., a bootable image for booting from a USB flash device, a bootable image for performing a network boot from target 130, etc.).

At step 210, access controller 112 may expose the bootable image to the BIOS of information handling system 102 as a device associated with the desired boot method, and at step 212, information handling system 102 may boot to the desired device according to the bootable image presented in step 210. For example, access controller 112 may expose the bootable image as a USB flash drive image, such that information handling system 102 may initiate a boot of an operating system included on the USB flash drive. Following step 212, method 200 may end. Thus, access controller 112 may configure information handling system 102 to boot from the desired device using the desired method without the user having to be in possession of a bootable image associated with the desired boot method.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order. For example, access controller 112 may download the non-bootable content 119 associated with the operating system from management server 122 and store the non-bootable content 119 locally before receiving a boot request. Further, method 200 may be implemented using system 100 or any other system operable to implement method 200. In certain embodiments, method 200 may be implemented partially or fully in software and/or firmware embodied in computer-readable media.

Figure 3:
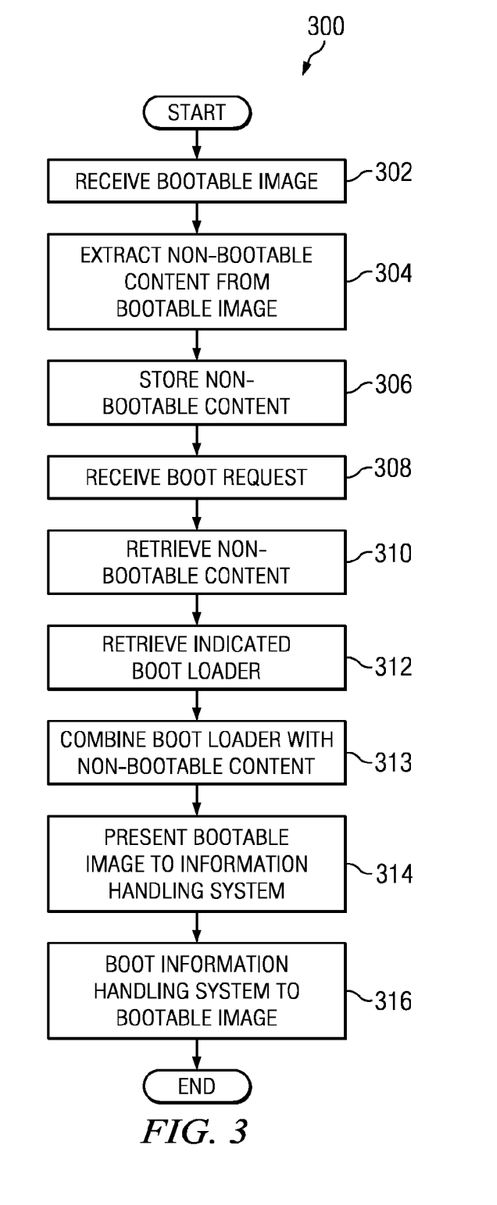
FIG. 3 illustrates a flow chart of another example method for configuring an information handling system to boot an operating system using one or more boot methodologies, in accordance with certain embodiments of the present disclosure.

FIG. 3 illustrates a flow chart of another example method (method 300) for configuring an information handling system (e.g., information handling system 102 of FIG. 1) to boot an operating system using one or more boot methodologies, in accordance with certain embodiments of the present disclosure. According to one embodiment, method 300 may begin at step 302. The steps of method 300 are described as being performed by access controller 112 of FIG. 1, but it is understood than any suitable system, apparatus or device may be used to perform one or more of the steps of method 300. As noted above, teachings of the present disclosure may be implemented in a variety of configurations of system 100. As such, the initialization point for method 300 and the order of the steps 302-322 comprising method 300 may depend on the implementation chosen.

At step 302, access controller 112 may receive a bootable image associated with a particular boot method (e.g., a USB flash drive bootable image). The bootable image may include non-bootable content 119 associated with an operating system and a boot loader associated with the particular boot method. At step 304, access controller 112 may extract the non-bootable content 119 (e.g., operating system kernel) from the bootable image received at step 302. At step 306, access controller 112 may store the non-bootable content 119 on a local storage device such as memory 114 or storage media 116. Accordingly, access controller 112 may separate the non-bootable content 119 associated with the operating system from the boot loader 117 associated with the boot method of the bootable image such that access controller 112 may combine the non-bootable content 119 with another boot loader 117 associated with a different boot method. Thus, access controller 112 may facilitate booting to the operating system using a plurality of boot methods.

At step 308, access controller 112 may receive a boot request from a user, substantially similar to the boot request described in step 202 of FIG. 2. The operating system in the boot request may be associated with the non-bootable content 119 extracted in step 304 and stored in step 306. Accordingly, in this particular example the boot request may indicate a local location of the non-bootable content 119 stored at step 306. At step 310, access controller 112 may retrieve the non-bootable content associated with the indicated operating system from local memory.

At step 312, access controller 112 may retrieve the boot loader 117 associated with the boot method indicated in the boot request. The boot method indicated by the boot request may be different than the boot method associated with the bootable image received at step 302, therefore, the retrieved boot loader 117 may be different than the boot loader 117 associated with the bootable image received in step 302. For example, the bootable image received at step 302 may be a USB flash drive bootable image and the desired boot method may be a network boot from target 130 via network 120. Therefore, the boot loader 117 retrieved at step 312 may be associated with a network boot, while the boot loader 117 associated with the bootable image received at step 302 may be a USB flash drive boot loader.

Similar to step 206 in FIG. 2, at step 312, access controller 112 may retrieve the boot loader 117 from a local storage device or may download the boot loader 117 from management server 122 via network 120. At step 313, access controller 112 may combine the boot loader 117 with the non-bootable content 119 to generate a bootable image associated with the boot method indicated in the boot request, similarly to step 208 of method 200 in FIG. 2

Further, at step 314, access controller 112 may present the bootable image to information handling system 102 and information handling system 102 may boot to the bootable image at step 316 similarly to steps 210 and 212 of method 200 in FIG. 2. Following step 316, method 300 may end. Accordingly, access controller 112 may be configured to extract non-bootable content 119 from a bootable image associated with one boot method and may combine that non-bootable content 119 with a boot loader 117 associated with another boot method to generate a bootable image associated with the other boot method. Thus, access controller 112 may facilitate booting information handling system 102 to an operating system using a plurality of boot methods even if the user of information handling system 102 does not have possession of a bootable image associated with all of the boot methods.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order. Method 300 may be implemented using system 100 or any other system operable to implement method 300. In certain embodiments, method 300 may be implemented partially or fully in software and/or firmware embodied in computer-readable media.

Using the methods and systems disclosed herein, problems associated with booting an operating system to an information handling system using a plurality of boot methods may be reduced or eliminated. For example, the user may boot an operating system to an information handling system using a boot method even if the user does not have a specific bootable image associated with that boot method. Accordingly, the present disclosure adds more flexibility in utilizing various methods to boot an information handling system to an operating system without requiring that the user of the information handling system perform time consuming, burdensome procedures.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
   a processor;
   a memory communicatively coupled to the processor; and
   an access controller communicatively coupled to the processor and configured to:
      receive a boot request indicating a boot method and select a boot loader based on the boot request;
      retrieve non-bootable executable instructions;
      combine the non-bootable executable instructions with the boot loader associated with the boot method to generate a bootable image associated with the boot method; and
      present the bootable image to the information handling system such that the bootable image is configured to be booted by the information handling system using the boot method.

2. An information handling system according to claim 1, the access controller further configured to retrieve the non-bootable instructions by downloading, via a network, the non-bootable executable instructions from a management server communicatively coupled to the information handling system via the network.

3. An information handling system according to claim 1, the access controller further configured to extract the non-bootable executable instructions from a second bootable image associated with a second boot method to retrieve the non-bootable executable instructions.

4. An information handling system according to claim 1, wherein the non-bootable executable instructions comprise an operating system kernel.

5. An information handling system according to claim 1, wherein the boot method comprises at least one of a network boot, booting from an optical disc drive, booting from a hard drive, booting from a floppy disc drive, booting from a flash memory device, booting from a universal serial bus (USB) device, and booting from a virtual device.

6. An information handling system according to claim 1, the access controller further configured to download the boot loader via a network from a management server communicatively coupled to the information handling system via the network.

7. An access controller comprising:
    a processor;
    a computer readable memory communicatively coupled to the processor; and
    processing instructions encoded in the computer readable memory, the processing instructions, when executed by the processor, operable to perform operations comprising:
        receive a boot request indicating a boot method and select a boot loader based on the boot request;
        retrieving non-bootable executable instructions;
        combining the non-bootable executable instructions with the boot loader associated with the boot method to generate a bootable image associated with the boot method; and
        presenting the bootable image to an information handling system including the access controller such that the bootable image is configured to be booted by the information handling system using the boot method.

8. An access controller according to claim 7, wherein retrieving the non-bootable instructions comprises downloading, via a network, the non-bootable executable instructions from a management server communicatively coupled to the information handling system via the network.

9. An access controller according to claim 7, the processing instructions further operable to perform operations comprising extracting the non-bootable executable instructions from a second bootable image associated with a second boot method to retrieve the non-bootable executable instructions.

10. An access controller according to claim 7, wherein the non-bootable executable instructions comprise an operating system kernel.

11. An access controller according to claim 7, wherein the boot method comprises at least one of a network boot, booting from an optical disc drive, booting from a hard drive, booting from a floppy disc drive, booting from a flash memory device, booting from a universal serial bus (USB) device, and booting from a virtual device.

12. An access controller according to claim 7, the processing instructions further operable to perform operations comprising downloading the boot loader via a network from a management server communicatively coupled to the information handling system via the network.

13. A method comprising:
    receiving, by an access controller, a boot request indicating a boot method and selecting, by the access controller a boot loader based on the boot request;
    retrieving, by the access controller, non-bootable executable instructions;
    combining, by the access controller, the non-bootable executable instructions with the boot loader associated with the boot method to generate a bootable image associated with the boot method; and
    presenting, by the access controller, the bootable image to an information handling system including the access controller such that the bootable image is configured to be booted by the information handling system using the boot method.

14. A method according to claim 13, further comprising retrieving, by the access controller, the non-bootable instructions by downloading, via a network, the non-bootable executable instructions from a management server communicatively coupled to the information handling system via the network.

15. A method according to claim 13, further comprising extracting, by the access controller, the non-bootable executable instructions from a second bootable image associated with a second boot method to retrieve the non-bootable executable instructions.

16. A method according to claim 13, wherein the non-bootable executable instructions comprise an operating system kernel.

17. A method according to claim 13, wherein the boot method comprises at least one of a network boot, booting from an optical disc drive, booting from a hard drive, booting from a floppy disc drive, booting from a flash memory device, booting from a universal serial bus (USB) device, and booting from a virtual device.

* * * * *